Aug. 23, 1960 HAJIME IINUMA 2,950,397

RESONANT CIRCUIT ELEMENT APPLICABLE FOR DIGITAL INFORMATION PROCESSING

Filed Sept. 16, 1957 4 Sheets-Sheet 1

Aug. 23, 1960

HAJIME IINUMA 2,950,397

RESONANT CIRCUIT ELEMENT APPLICABLE FOR DIGITAL INFORMATION PROCESSING

Filed Sept. 16, 1957

4 Sheets-Sheet 4

United States Patent Office 2,950,397

Patented Aug. 23, 1960

2,950,397

RESONANT CIRCUIT ELEMENT APPLICABLE FOR DIGITAL INFORMATION PROCESSING

Hajime Iinuma, Komae-Machi, Kitatama-gun, Tokyo-to, Japan, assignor to Kokusai Denki Kabushiki Kaisha, Komae-Machi, Kitatama-gun, Tokyo-to, Japan Filed Sept. 16, 1957, Ser. No. 684,086

Claims priority, application Japan Sept. 19, 1956

8 Claims. (Cl. 307—88)

This invention relates to improvements of a resonant circuit element applicable for digital information processing.

It is well-known that when a resonant circuit consisting of a coil including a ferro-magnetic nonlinear core such as ferrite core and a capacitor having a linear characteristic is tuned to a frequency $f$ and said said core is excited by an alternating current ampere-turns of frequency $2f$ superimposed on a biasing direct current ampere-turns, a subharmonic oscillation wave of the frequency $f$ is generated in said resonant circuit, generation of said oscillation wave being due to nonlinear characteristic of the ferro-magnetic core. The above-mentioned oscillation wave has a stable and constant amplitude and has a fixed phase relationship relative to the phase of the exciting current ampere-turns of the frequency $2f$. Generally, the phase of said oscillation wave takes only one of two phases at a time which are different by 180° from each other.

For obtaining the output oscillation wave having one desirable phase out of said two phases, it is necessary merely to initiate the excitation of the ferro-magnetic core of the resonant circuit by an alternating current of the frequency $2f$ while previously exciting said resonant circuit by a weak input signal having the frequency $f$ and said desirable phase.

Accordingly, the above-mentioned resonant circuit can be used as a simple, economical and reliable element of any digital information processing system. Such a system utilizing said resonant circuit has already been realized in Japan.

An essential object of this invention is to provide an effective construction of such a resonant circuit as described above which is simple in its manufacturing process and construction, and dissipates very low exciting power of the frequency $2f$.

Said object and other objects of this invention have been attained by a circuit device which comprises a single ferro-magnetic plate provided with a single window and two small holes which are made in such a manner that narrow portions each having sectional area which is sufficiently small in comparison with those in the other portions of said plate are formed, input signal conductors which are made to interlink with said window, a high frequency exciting conductor which is made to interlink with said holes, and a high frequency coil wound around said plate so as to include said narrow portions in its main magnetic circuit.

The novel features which I believe to be characteristics of my invention are set forth with particularity in the appended claims. My invention itself, however, both as to its manner of construction and manner of operation together with further objects and advantages thereof, may best be understood by reference to the following description taken in connection with the accompanying drawings, in which the same members are indicated by the same numerals and characters, and in which:

Figure 1A:
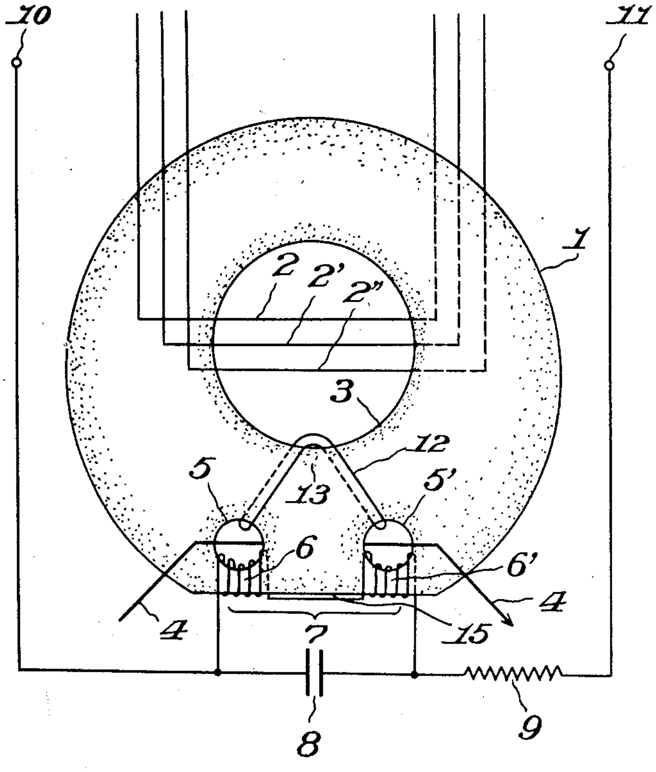
Fig. 1A is an enlarged schematic plan view of one embodiment of this invention.
Figure 1B:
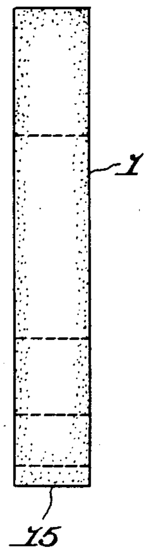
Fig. 1B is a side view of the core of the embodiment in Fig. 1A.

Referring to Figs. 1A and 1B, the ferro-magnetic core 1 is made of a single ferrite plate which is provided with a circular window 3 and two small holes 5 and 5'. Through said window, the input signal conductors 2, 2' and 2'' are made to interlink with said core 1; and through said holes, an exciting conductor 4 is made to interlink with said core 1. By the formation of said holes 5 and 5', two portions 6 and 6' each having narrowest sectional area are formed in the core 1. A resonant circuit is formed by a capacitor 8 and a high frequency resonant coil 7 which is wound around said portions 6 and 6' through said holes 5 and 5'. Said resonant circuit is connected with the output terminals 10 and 11 through a decoupling resistance 9.

Figures 2A, 2B:
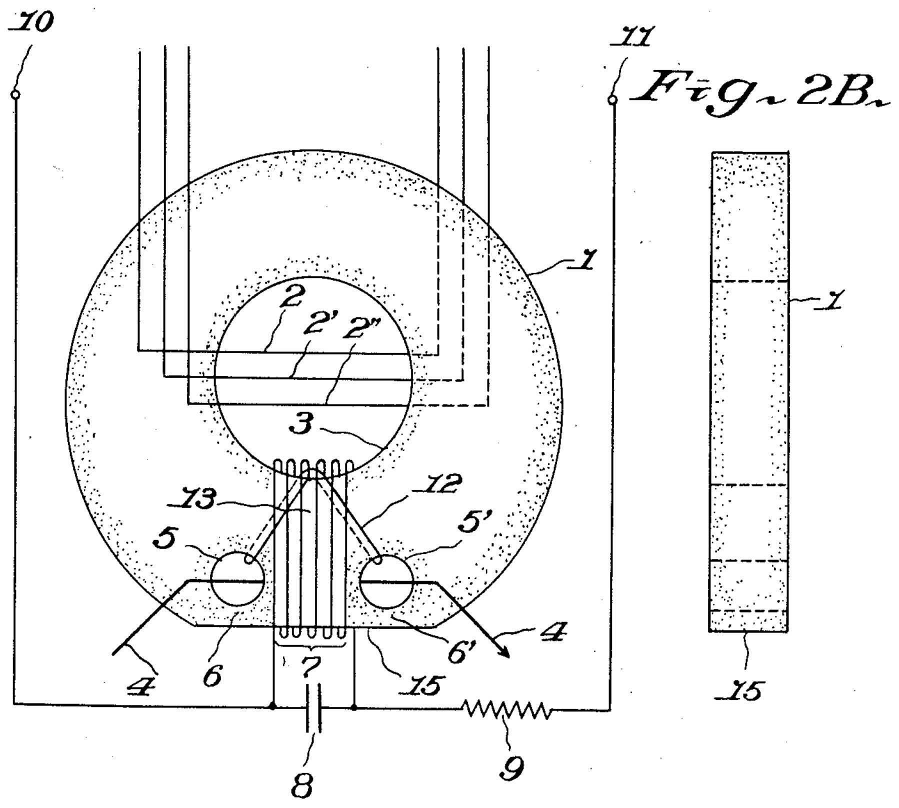
Fig. 2A is an enlarged schematic plan view of another embodiment of this invention.
Fig. 2B is a side view of the core of the embodiment in Fig. 2A.

The embodiment in Figs. 2A and 2B is almost the same as that in Figs. 1A and 1B except in that in the former, the resonant coil 7 is wound around the core through the window 3 at the position between the holes 5 and 5'.

Figures 3A, 3B:
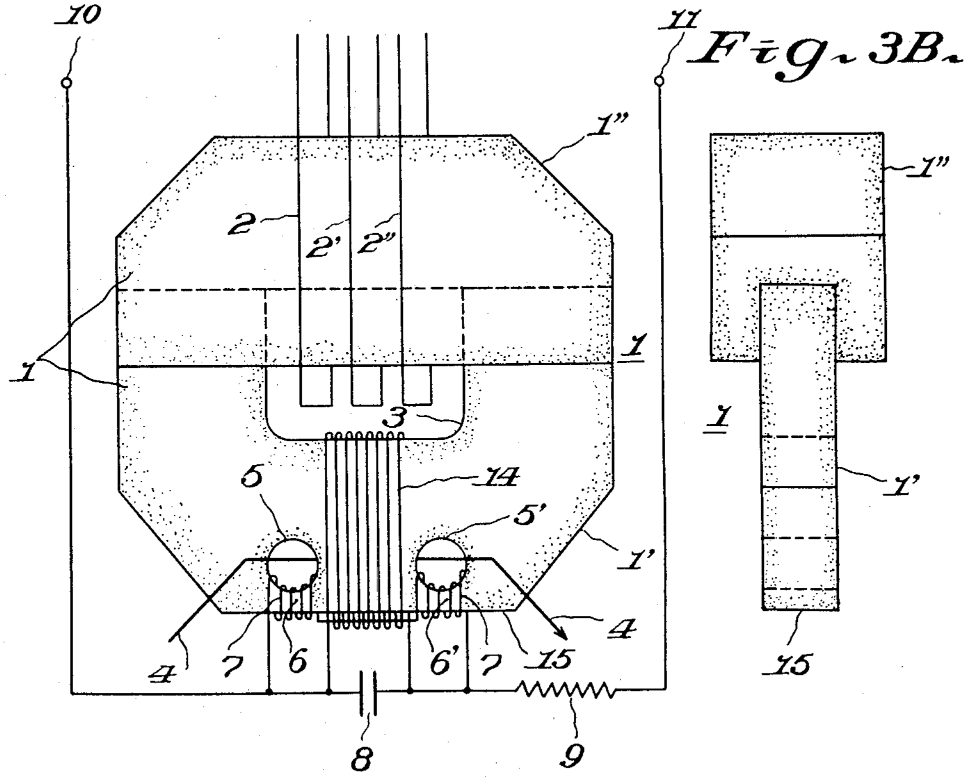
Fig. 3A is an enlarged schematic plan view of a further embodiment of this invention.
Fig. 3B is a side view of the core of the embodiment in Fig. 3A.

The embodiment in Figs. 3A and 3B is almost the same as that in Figs. 1A and 1B except in that in the former, an additional coil 14 is wound around the core 1 through the window 3 and the core 1 is composed of two pieces 1' and 1'', said piece 1'' being provided with a conduit in which the piece 1' is fitted and made to adhere.

Figure 4A:
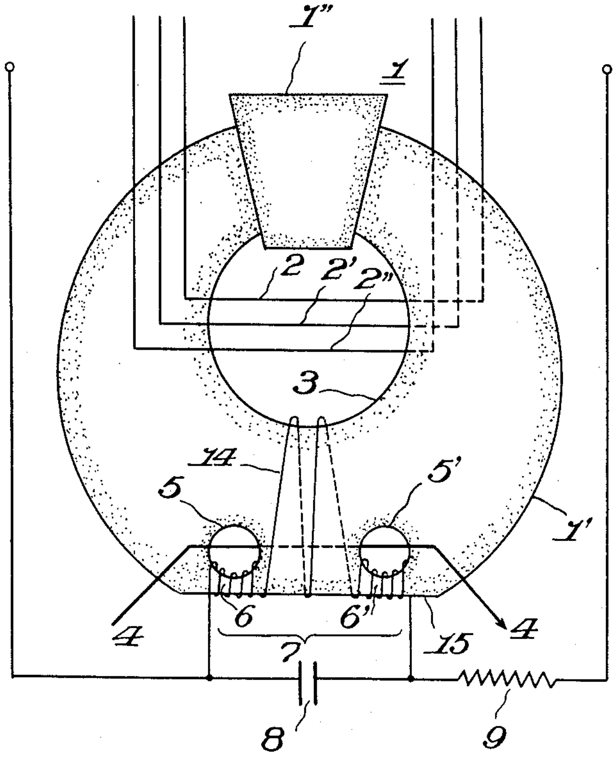
Fig. 4A is an enlarged plan view of a still further embodiment of this invention.
Figure 4B:
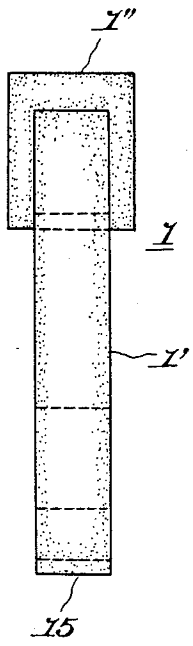
Fig. 4B is a side view of the core of the embodiment in Fig. 4A.

The embodiment in Figs. 4A and 4B is almost the same as that in Figs. 3A and 3B except in that in the former embodiment, the core 1 is composed of two pieces, one being a sector piece 1'' and the other being a piece 1' having a cut portion into which said sector piece 1'' is fitted and made to adhere, and the coil 14 is connected in series with the coil 7.

In the above-mentioned embodiments, it is necessary to make a suitable electromagnetic mutual induction coupling exist between the input signal conductors 2, 2' and 2'' and the resonant circuit of the frequency $f$. For establishment of said coupling, in the embodiments in Figs. (1A, 1B) and (2A, 2B), a short-circuit coil 12 is wound around the core 1 through the window 3 and the holes 5 and 5' in such a manner that the magnetic circuit portion 13 may become nonconductive for the mutual induction between the input signal conductors 2, 2' and 2'' and the resonant circuit; and in the embodiments in Figs. (3A, 3B) and (4A, 4B), a coil 14 is wound around the core 1 through the window 3 so as to be coupled with the input signal conductors 2, 2' and 2'' in such a manner that said conductors and the coil 14 form, respectively, the primary coils and the secondary coil of a transformer.

In the above-mentioned embodiments, it is preferable to grind a part 15 of the core 1 so as to adjust precisely the sectional area of the core portions 6 and 6'. By such a method, it is possible to finish the width of the core portions 6 and 6' to 2 mils or less, whereby in spite of a large magnetic induction at said core portions 6 and 6′, hysteresis loss (exciting power of the exciting current of the frequency $2f$) is remarkably decreased.

As a whole, the resonant circuit device of this invention is much more simple in its construction and manufacturing process and requires lower exciting power dissipation than those in the conventional resonant circuit devices of the same working principle.

While I have described particular embodiments of my invention, it will, of course, be understood that I do not wish my invention to be limited thereto, since many modifications may be made and I, therefore, contemplate by the appended claims to cover all such modifications as fall within the true spirit and scope of my invention.

I claim:

1. A subharmonic magnetic core logic device comprising, a plate of ferromagnetic material having a central window and two holes each of less area than the window disposed radially of the window angularly, spaced relative to each other and disposed on a marginal portion of the plate closely adjacent the periphery of the plate, at least one input conductor on said plate threaded through said window to which an input signal is applied, a resonant output circuit in said device comprising, a resonant coil wound on said plate having series turns wound through said holes and including marginal portions of the plate radially spaced relative to a respective one of said holes forming a core for the coil, a capacitive reactance element connected in parallel with said coil, a conductor threaded through said holes for applying an exciting current thereto of twice the frequency of the output, and output connections in series with said resonant coil.

2. A subharmonic magnetic logic device comprising, a plate of ferromagnetic material having a central window and two holes each of less area than the window disposed radially of the window angularly, spaced relative to each other and disposed on a marginal portion of the plate closely adjacent the periphery of the plate, at least one input conductor on said plate threaded through said window to which an input signal is applied, a resonant output circuit in said device comprising, a resonant coil wound on said plate having series turns wound through said holes and including marginal portions of the plate radially spaced relative to a respective one of said holes forming a core for the coil, a capacitive reactance element connected in parallel with said coil, a conductor threaded through said holes for applying an exciting current thereto of twice the frequency of the output, a second coil in series with the resonant coil having turns wound through said window intermediate the turns of the resonant coil and between said holes, and output connections in series with said resonant coil.

3. A subharmonic magnetic core logic device comprising, a plate of ferromagnetic material having a central window and two holes each of less area than the window disposed radially of the window angularly, spaced relative to each other and disposed on a marginal portion of the plate closely adjacent the periphery of the plate, at least one input conductor on said plate threaded through said window to which an input signal is applied, a resonant output circuit in said device comprising, a resonant coil wound on said plate having series turns wound through said holes and including marginal portions of the plate radially spaced relative to a respective one of said holes forming a core for the coil, a capacitive reactance element connected in parallel with said coil, a conductor threaded through said holes for applying an exciting current thereto of twice the frequency of the output, a short-circuiting coil for short-circuiting the turns of the resonant coil having turns wound through said window intermediate the turns of the resonant coil and wound through said holes, and output connections in series with said resonant coil.

4. A subharmonic magnetic core logic device comprising, a plate of ferromagnetic material having a central window and two holes each of less area than the window disposed radially of the window angularly, spaced relative to each other and disposed on a marginal portion of the plate closely adjacent the periphery of the plate, at least one input conductor on said plate threaded through said window to which an input signal is applied, a resonant output circuit in said device comprising, a resonant coil wound on said plate having series turns wound through said holes and including marginal portions of the plate radially spaced relative to a respective one of said holes forming a core for the coil, a capacitive reactance element connected in parallel with said coil, a conductor threaded through said holes for applying an exciting current thereto of twice the frequency of the output and output connections in series with said resonant coil.

5. A subharmonic magnetic core logic device comprising, a plate of ferromagnetic material having a central window and two holes each of less area than the window disposed radially of the window angularly, spaced relative to each other and disposed on a marginal portion of the plate closely adjacent the periphery of the plate, at least one input conductor threaded through said window to which an input signal is applied, a resonant output circuit in said device comprising, a resonant coil wound on said plate having series turns wound through said holes and including marginal portions of the plate radially spaced relative to a respective one of said holes forming a core for the coil, a capacitive reactance element connected in parallel with said coil, a conductor threaded through said holes for applying an exciting current thereto of twice the frequency of the output, a second coil in series with the resonant coil having at least one turn wound through said window intermediate the turns of the resonant coil and between said holes, and output connections in series with said resonant coil.

6. A subharmonic magnetic core logic device comprising, a plate of ferromagnetic material having a central window and two holes each of less area than the window disposed radially of the window angularly, spaced relative to each other and disposed on a marginal portion of the plate closely adjacent the periphery of the plate, an odd number of input conductors on said plate threaded through said window to which input signals are applied for controlling the phase of the output of the harmonic device on a majority principle, a resonant output circuit in said device comprising, a resonant coil wound on said plate having series turns wound through said holes and including marginal portions of the plate radially spaced relative to a respective one of said holes forming a core for the coil, a capacitive reactance element connected in parallel with said coil, a conductor threaded through said holes for applying an exciting current thereto of twice the frequency of the output, and output connections in series with said resonant coil.

7. A subharmonic magnetic core logic device comprising, a plate of ferromagnetic material having a central window and two holes each of less area than the window disposed radially of the window angularly, spaced relative to each other and disposed on a marginal portion of the plate closely adjacent the periphery of the plate, an odd number of input conductors on said plate threaded through said window to which input signals are applied for controlling the phase of the output of the harmonic device on a majority principle, a resonant output circuit in said device comprising, a resonant coil wound on said plate having series turns wound through said holes and including marginal portions of the plate radially spaced relative to a respective one of said holes forming a core for the coil, a capacitive reactance element connected in parallel with said coil, a conductor threaded through said holes for applying an exciting current thereto of twice the frequency of the output, a second coil in series with the resonant coil having at least one turn wound through said window intermediate the turns of the resonant coil and between said holes, and output connections in series with said resonant coil.

8. A subharmonic magnetic core logic device comprising, a plate of ferromagnetic material having a central window and two holes each of less area than the window disposed radially of the window angularly, spaced relative to each other and disposed on a marginal portion of the plates, closely adjacent the periphery of the plate, at least one input conductor on said plate threaded through said window to which an input signal is applied, a resonant output circuit in said device comprising, a resonant coil wound on said plate having series turns wound through said holes and including marginal portions of the plate radially spaced relative to a respective one of said holes forming a core for the coil, a capacitive reactance element connected in parallel with said coil, a conductor threaded through said holes for applying an exciting current thereto of twice the frequency of the output, a second coil in parallel with the resonant coil having turns wound through said window intermediate the turns of the resonant coil and between said holes, and output connections in series with said resonant coil.

References Cited in the file of this patent

UNITED STATES PATENTS

| | | |
|---|---|---|
| 2,818,556 | Lo | Dec. 31, 1957 |
| 2,855,586 | Brown | Oct. 7, 1958 |

FOREIGN PATENTS

| | | |
|---|---|---|
| 881,089 | Germany | June 25, 1953 |
| 778,883 | Great Britain | July 10, 1957 |